(12) United States Patent
Kim

(10) Patent No.: US 6,876,909 B2
(45) Date of Patent: Apr. 5, 2005

(54) ELECTRONICALLY CONTROLLED SUSPENSION APPARATUS FOR USE IN ANTI-SQUAT CONTROL

(75) Inventor: Wanil Kim, Kyonggi-do (KR)

(73) Assignee: Mando Corporation, Kyonggi-do (KR)

( * ) Notice: Subject to any disclaimer, the term of this patent is extended or adjusted under 35 U.S.C. 154(b) by 57 days.

(21) Appl. No.: 10/643,936

(22) Filed: Aug. 20, 2003

(65) Prior Publication Data

US 2004/0039506 A1 Feb. 26, 2004

(30) Foreign Application Priority Data

Aug. 21, 2002 (KR) .................................. 10-2002-0049486

(51) Int. Cl.[7] .......................... B60G 23/00; B60G 17/00
(52) U.S. Cl. ...................................... 701/37; 280/5.513
(58) Field of Search .................. 701/37, 38; 280/5.507, 280/5.513, 5.515, 5.519

(56) References Cited

U.S. PATENT DOCUMENTS

| 4,789,935 A | * | 12/1988 | Buma et al. .................. 701/37 |
| 4,975,849 A | * | 12/1990 | Ema ............................. 701/37 |
| 6,070,681 A | * | 6/2000 | Catanzarite et al. ...... 180/89.15 |
| 6,360,148 B1 | * | 3/2002 | Halpin .......................... 701/37 |

* cited by examiner

Primary Examiner—Michael J. Zanelli
(74) Attorney, Agent, or Firm—Bacon & Thomas PLLC

(57) ABSTRACT

An ECU of an ECS apparatus has a determination block for determining whether the TPS signal rises to be greater than a first reference value and for determining whether the TPS signal declines to be less than a second reference value; and a damper control block, which adjusts a damping force of the front damper according to the determination result. The damper control block sets the front damper into a hard rebound mode when the determination block determines that the TPS signal rises to be greater than the first reference value, and then the damper control block sets the front damper into a hard compression mode when the determination block determines that the TPS signal declines to become less than the second reference value.

9 Claims, 6 Drawing Sheets

ELECTRONICALLY CONTROLLED SUSPENSION APPARATUS FOR USE IN ANTI-SQUAT CONTROL

FIELD OF THE INVENTION

The present invention relates to an electronically controlled suspension (ECS) apparatus; and more particularly, to an electronically controlled suspension apparatus capable of performing anti-squat control in a manner that a squat of a vehicle and a subsequent dive thereof can be suppressed.

BACKGROUND OF THE INVENTION

In general, an electronically controlled suspension (ECS) apparatus is installed between a wheel axle and a vehicle body, so that it absorbs road shocks exerted on the vehicle axle to protect goods from damage and improve ride comfort. Further, the ECS apparatus controls an attitude (e.g. a roll, a squat or a dive) of the vehicle body experiencing forces incurred by, e.g., a turning, an acceleration, or a deceleration of a vehicle.

In order to perform such a vehicle attitude control, the suspension apparatus adjusts a damping force of a variable damper incorporated therein by activating an actuator of, e.g., a step motor type or a solenoid type, of the variable damper depending on driving conditions, such as a speed, a deceleration and an acceleration of the vehicle, and on a road surface condition.

For example, the variable damper having the actuator of the step motor type is provided with a control rod, which is rotated clockwise or counterclockwise by a certain angle by the actuator. And an effective cross-sectional area of an orifice in the variable damper is varied by the rotation of the control rod, which results in a variation of the damping force of the variable damper.

The variable dampers are usually classified into two types. One type is a reverse type, in which a rebound damping force and a compression damping force are individually controlled. The other is a normal type, in which the rebound damping force and the compression damping force are increased or decreased together.

By adjusting damping forces, the reverse type damper selectively produces three damper settings, i.e., a firm (or hard) rebound with a soft compression (hereinafter referred to as an H/S), a soft rebound with a soft compression (hereinafter referred to as an S/S) and a soft rebound with a firm (or hard) compression (hereinafter referred to as an S/H). And the normal type damper selectively produces two damper settings, i.e., a firm rebound with a firm compression (and hereinafter referred to as an H/H) and S/S.

Referring to FIG. 1, there is illustrated a conventional ECS apparatus for an anti-squat control, which includes a throttle position sensor (TPS) 10 for producing an electrical signal which is representative of a throttle opening angle, an electronic control unit (ECU) 20, a front left and front right dampers 30F and a rear left and rear right dampers 30R.

The conventional ECS apparatus performs an anti-squat control as follows: First, when the ECU 20 determines that the TPS signal produced from the TPS 10 becomes greater than a predetermined threshold ((a) of FIG. 2), it varies damping forces of the front and rear dampers 30F, 30R by activating actuators ((b) and (c) of FIG. 2). For example, if the TPS signal is greater than the threshold and the front and rear dampers 30F, 30R are of the reverse type, the ECU 20 sets the front variable dampers 30F into the H/S mode to provide hard rebound and soft compression strokes and sets the rear variable dampers 30R into the S/H mode to provide soft rebound and hard compression strokes. In contrast, if the front and rear dampers 30F, 30R are of the normal type, the ECU 20 sets the front and rear dampers 30F, 30R into the H/H mode to provide hard rebound and hard compression strokes.

The ECU 20 increases or decreases the damping force of the damper by a fixed amount, or by an amount proportional to a level of the TPS signal or of a differentiated value thereof. Further, the dampers are set into the S/S mode again after a predetermined period of time, i.e., a control time T1, so that the riding comfort can be recovered.

In such a conventional ECS apparatus, a squat (or nose-up) occurring when the TPS signal increases can be suppressed; however, when an acceleration pedal is released so that the TPS signal decreases and the vehicle is not accelerated anymore (see (d) of FIG. 2), there still occurs a dive, i.e., a sudden drop of a nose portion of the vehicle, thereby resulting in deterioration of the riding comfort of the vehicle. (In FIG. 2, it is assumed for simplicity that the vehicle is being accelerated from time t0 to t1.)

SUMMARY OF THE INVENTION

It is, therefore, an object of the present invention to provide an ECS apparatus for an anti-squat control which is capable of suppressing a squat occurring when a TPS signal rises and a drop of a nose portion of a vehicle occurring when the TPS signal declines after the rise thereof.

It is another object of the present invention to provide an ECS for an anti-squat control which is capable of suppressing a squat occurring when a differentiation value of the TPS signal rises and a drop of a nose portion of the vehicle occurring when the differentiation value of the TPS signal declines after the rise thereof.

In accordance with a preferred embodiment of the present invention, there is provided an electronically controlled suspension apparatus, including:

a throttle position sensor for producing a TPS signal which is representative of an amount of a throttle opening;

at least one front damper mounted on a front portion of a vehicle body; and an electronic control unit having:

a determination block for determining whether the TPS signal rises to be greater than a first reference value and for determining whether the TPS signal declines to be less than a second reference value; and a damper control block, which adjusts a damping force of said at least one front damper according to the determination result made by the determination block, wherein the damper control block sets said at least one front damper into a hard rebound mode to produce a hard rebound stroke during a first control time period when the determination block determines that the TPS signal rises to be greater than the first reference value, and then the damper control block sets said at least one front damper into a hard compression mode to produce a hard compression stroke for a second control time period when the determination block determines that the TPS signal declines to become less than the second reference value.

In accordance with another preferred embodiment of present invention, there is provided an electronically controlled suspension apparatus, including:

a throttle position sensor for producing a TPS signal which is representative of an amount of a throttle opening;

at least one front damper mounted on a front portion of a vehicle body; and an electronic control unit having:

a differentiation block for differentiating the TPS signal;

a determination block for determining whether the differentiated TPS signal increases to be greater than a first reference value and for determining whether the TPS signal decreases to be less than a second reference value; and a damper control block, which adjusts a damping force of said at least one front damper according to the determination result made by the determination block, wherein the damper control block sets said at least one front damper into a hard rebound mode to produce a hard rebound stroke for a first control time period when the determination block determines that the differentiated TPS signal increases to be greater than a first reference value, and then the damper control block sets said at least one front damper into a hard compression mode for a second control time period when the determination block determines that the differentiated TPS signal decreases to be less than the second reference value.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
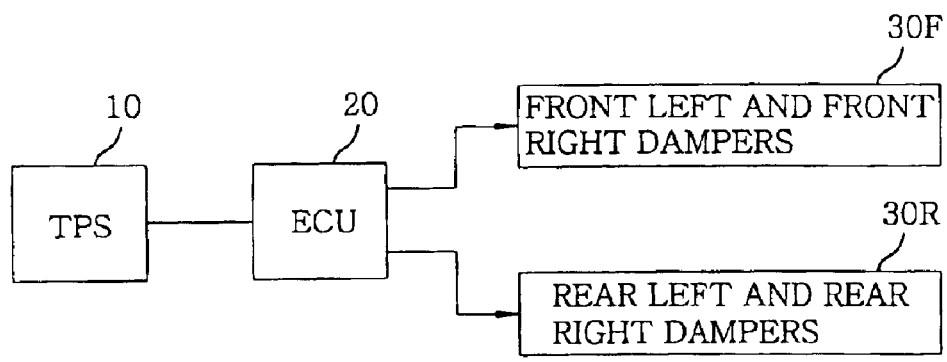
FIG. 1 is a conventional ECS apparatus for an anti-squat control in a block diagram.
Figure 2:
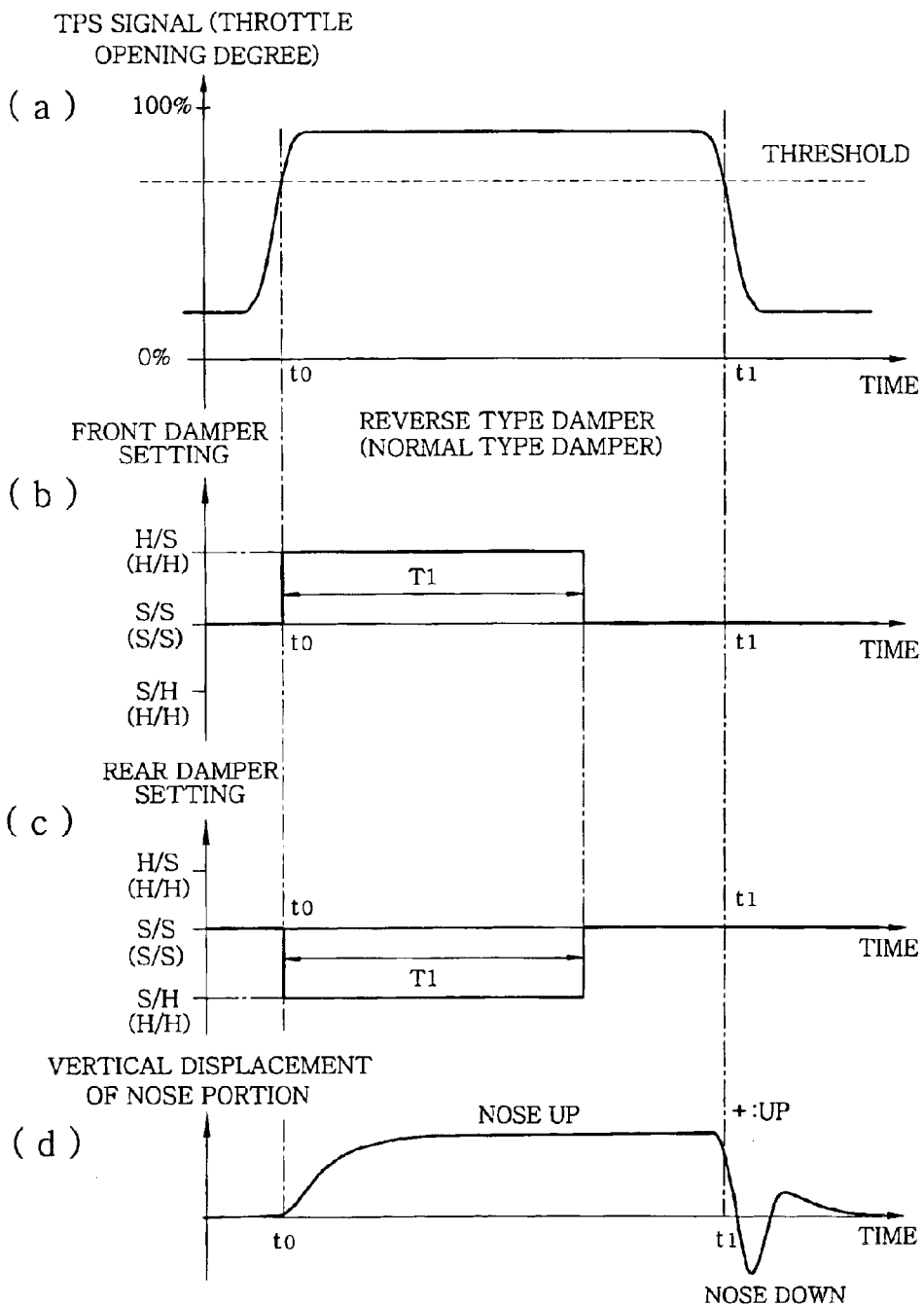
FIG. 2 presents graphs illustrating a damping force profile provided by the conventional ECS apparatus and a vertical displacement of a nose portion of a vehicle.

Preferred embodiments of the present invention will now be described in detail with reference to the accompanying drawings, wherein like parts appearing FIGS. 3 to 6 are represented by like reference numerals.

Figure 3:
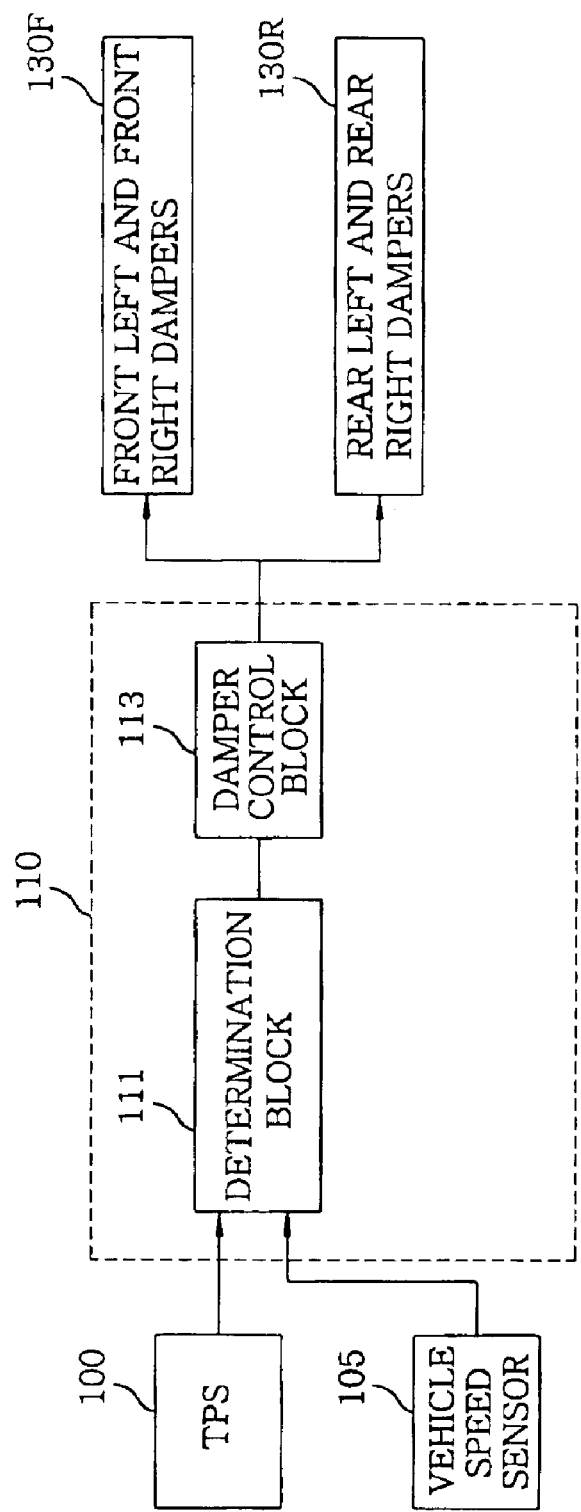
FIG. 3 depicts an ECS apparatus for an anti-squat control in a block diagram and in accordance with a first preferred embodiment of the present invention.

Referring to FIG. 3, there is illustrated an ECS (electronically controlled suspension) apparatus for anti-squat control in accordance with a first preferred embodiment of the present invention. The ECS apparatus for anti-squat control includes a TPS (throttle position sensor) 100 for producing an electrical TPS signal which is representative of a degree (or amount) of throttle opening, a vehicle speed sensor 105 for producing a speed signal which is representative of a speed of a vehicle, an ECU (electronic control unit) 110, front left and front right dampers 130F and rear left and rear right dampers 130R.

The ECU 110 determines damping forces of the dampers 130F, 130R in response to the TPS signals generated from the TPS 100 and optionally depending on the speed signals generated from the vehicle speed sensor 105. Then, the ECU 110 adjusts the damping forces of the front and rear dampers 130F, 130R according to the thus determined damping forces by way of activating actuators of, e.g., a step motor type or a solenoid type (not shown), of the dampers 130F, 130R.

The ECU 110 is provided with a determination block 111, which determines whether the TPS signal increases to be greater than a first reference value and also determines whether the TPS signal declines to be less than a second reference value; and a damper control block 113, which adjusts the damping forces of the dampers 130F, 130R according to the determination result made by the determination block 111.

The operation of the ECS apparatus of the present invention will now be described with reference to FIG. 4, which illustrates a damping force control profile provided by the ECS apparatus.

First, the TPS and speed signals are transmitted from the TPS 100 and the vehicle speed sensor 105 to the determination block 111 in which an increasing TPS signal is compared with a first reference value RV1 and a decreasing TPS signal is compared with a second reference value RV2, wherein the first reference value RV1 is different from and preferably greater than the second reference value RV2. If the determination block 111 determines that the TPS signal rises to exceed the first reference value RV1 at time t0 (see (a) of FIG. 4), the determination block 111 transmits an anti-squat signal to the damper control block 113 in order to operate the dampers 130F and 130R in an anti-squat mode as described below. Then, the damper control block 113 adjusts the damping forces of the dampers 130F, 130R substantially at time t0 in response to the anti-squat signal in order to suppress a squat.

Figure 4:
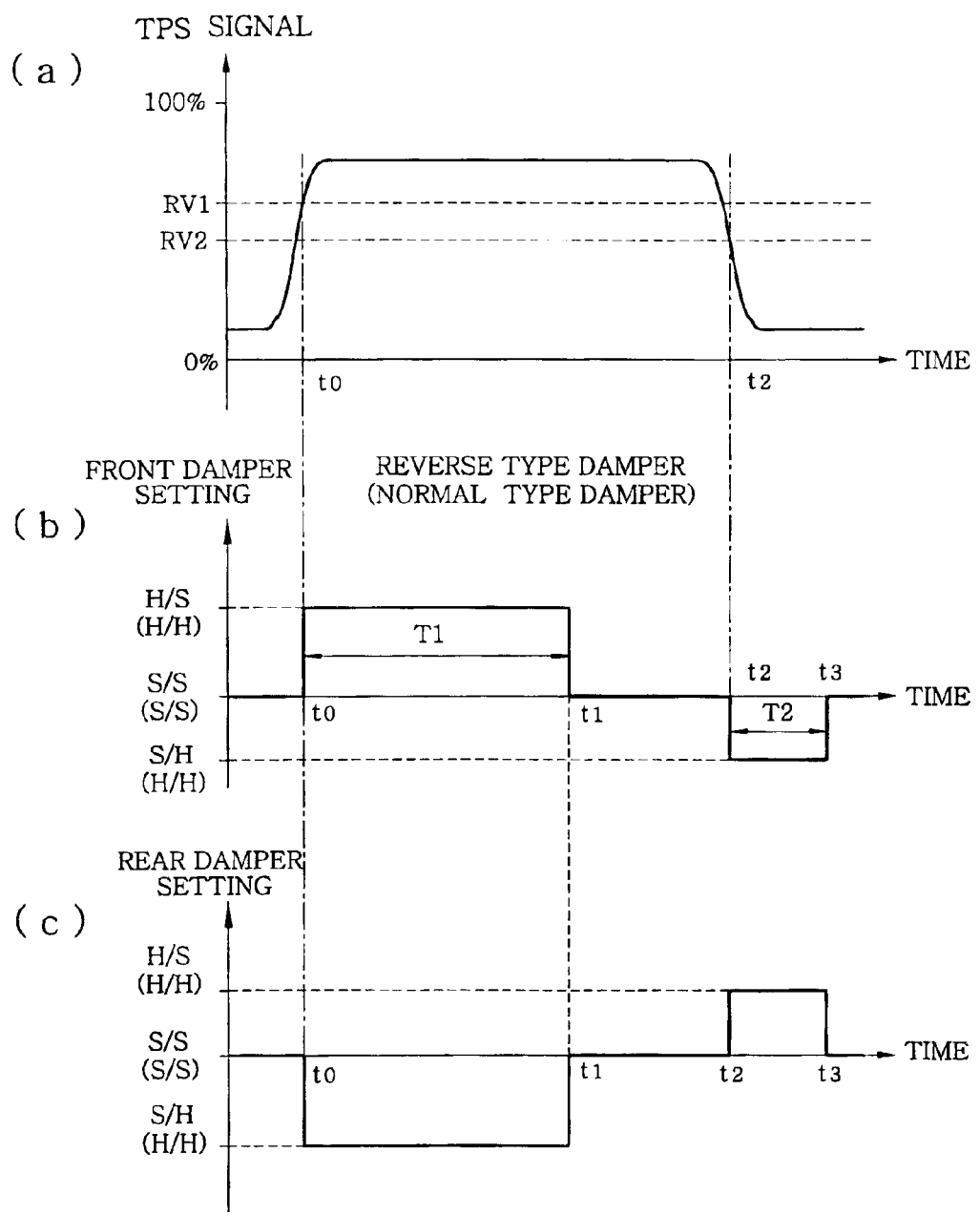
FIG. 4 offers a graph illustrating a damping force profile provided by the ECS apparatus of the first preferred embodiment.

As shown in (b) and (c) of FIG. 4, in a case where the dampers 130F, 130R are of the reverse type, the damper control block 113 sets the front dampers 130F into an H/S mode and maintains this damper setting from time t0 to time t1, i.e., during a control time period T1, to provide hard rebound and soft compression strokes, and sets the rear dampers 130R into an S/H mode and maintains this damper setting during the control time period T1, to provide soft rebound and hard compression strokes.

In contrast, if the dampers 130F, 130R are of the normal type, the damper control block 113 sets the front and rear dampers 130F, 130R into an H/H mode and maintains this damper setting during the control time T1, to provide hard rebound and hard compression strokes.

After the control time T1, the determination block 111 transmits a reverting signal to the damper control block 113. Then, the damper control block 113 sets the front and rear dampers 130F, 130R into an S/S mode again and maintain this damper setting until the determination block 111 determines that the TPS signal decreases to be less than the second reference value RV2 at time t2 (see (a) of FIG. 4).

If the determination block 111 makes such a determination, it transmits an anti-dive signal to the damper control block 113 to operate the dampers 130F, 130R in an anti-dive mode as described below. Then, the damper control block 113 adjusts the damping forces of the dampers 130F, 130R substantially at time t2 in order to suppress a dive.

As shown in (b) and (c) of FIG. 4, when the dampers 130F, 130R are of the reverse type, the damper control block 113 sets the front dampers 130F into the S/H mode and maintains this damper setting from time t2 to time t3, i.e., during the control time period T2 to provide the soft rebound and hard compression strokes, and sets the rear dampers 130R into the H/S mode over the control time period T2 to provide the hard rebound and soft compression strokes.

In contrast, if the dampers 130F, 130R are of the normal type, the damper control block 113 sets the dampers 130F, 130R into an H/H mode during the control time T2 to provide the hard rebound and hard compression strokes.

After the control time T2, the determination block 111 transmits the reverting signal to the damper control block 113. Then, the damper control block 113 sets the front and rear dampers 130F, 130R into the S/S mode and maintain this damper setting until the determination block 111 determines that the TPS signal increases to be greater than the first reference value RV1 again.

The degree of the damping forces (i.e., the degree of the hardness and/or softness of the dampers) can be preferably made to be constant irrespective of the vehicle speed. In the present invention, however, the determination block 111 more preferably determines the degree of the damping forces of the dampers 130F, 130R depending on the speed signal transmitted from the vehicle speed sensor 105. In such a case, the anti-squat, and anti-dive signals transmitted from the determination block 111 to the damper control block 113 need to carry information about the degree of the damping forces. For instance, since the amount of squat and dive are likely to become greater at a lower vehicle speed, the degree of damping forces can be made to vary in inverse proportion to the speed of the vehicle at time t0 or time t2. Specifically, in case of the reverse type front dampers, the rebound and the compression of the dampers can be made harder and softer, respectively during the control time period T1, if the speed of the vehicle is lower at time t0. Similarly, the rebound and the compression of the front dampers of the reverse type can be controlled softer and harder during the control time period T2 for the lower vehicle speed at time t2. The rear dampers of the reverse type and the normal type dampers can be controlled in a similar manner. In addition, the lengths of the control time periods T1, and T2 can be made to vary depending on the vehicle speed detected by the vehicle speed sensor 105. Preferably, the lengths of the control times periods T1, and T2 are set in inverse proportion to the speed of the vehicle at time t0 and t2, respectively.

Further, if the time t2 precedes the time t1, the determination block 111 transmits the anti-dive signal to the damper control block 113 at time t2 without transmitting the reverting signal, so that the anti-squat control stops and the anti-dive control starts substantially at time t2.

As described above, the ECS apparatus for an anti-squat control in accordance with the first preferred embodiment sets the dampers into the anti-dive mode during the control time period T2 when the TPS signal decreases to be less than a second reference value. Therefore, a sudden drop of a front portion of the vehicle usually occurring when the TPS signal declines after a rise can be suppressed.

Figure 5:
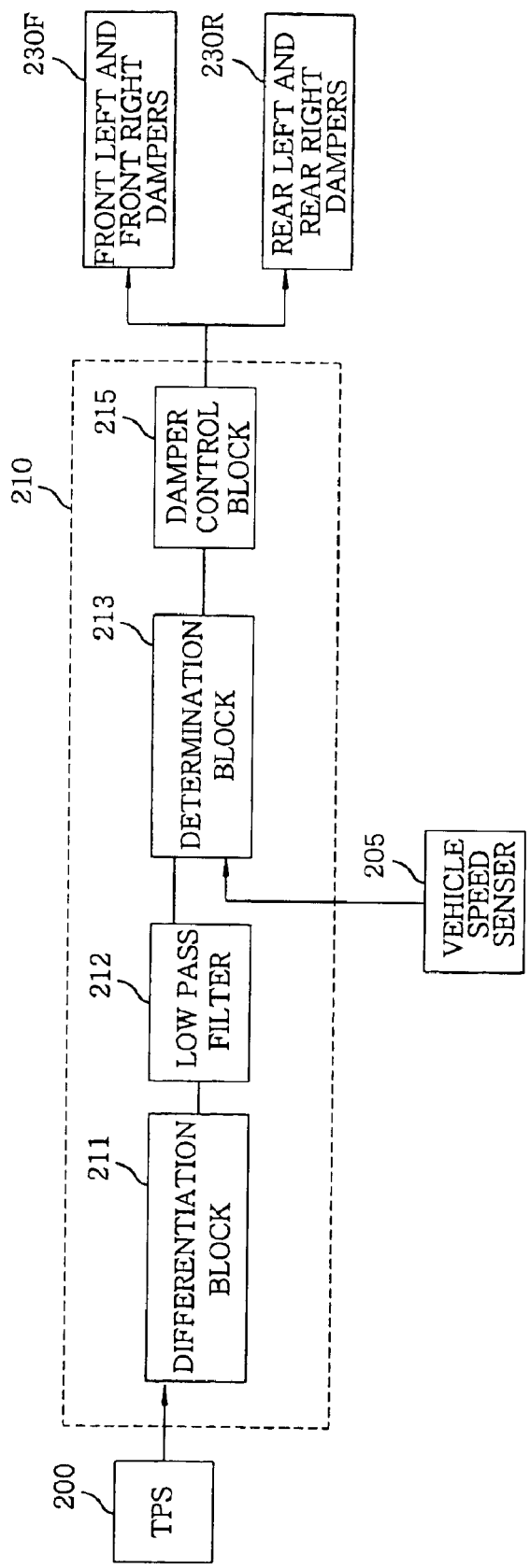
FIG. 5 sets forth an ECS apparatus for an anti-squat control in a block diagram and in accordance with a second preferred embodiment of the present invention.

Referring to FIG. 5, there is illustrated an ECS apparatus for anti-squat control in accordance with a second preferred embodiment of the present invention. The ECS apparatus for anti-squat control of the second preferred embodiment includes a throttle position sensor (TPS) 200 for producing an electrical TPS signal which is representative of a degree (or amount) of throttle opening, a vehicle speed sensor 205 for producing a speed signal which is representative of a speed of a vehicle, an electronic control unit (ECU) 210, front left and front right dampers 230F and rear left and rear right dampers 230R.

The ECU 210 determines damping forces of the dampers 230F, 230R in response to the TPS signals generated from the TPS 200 and optionally depending on the speed signal generated from the vehicle speed sensor 205. Then, the ECU 210 adjusts the damping forces of the front and rear dampers 230F, 230R respectively according to the thus determined damping forces by way of operating actuators (not shown) of the dampers 230F, 230R.

The ECU 210 is provided with a differentiation block 211, which differentiates the TPS signal generated from the TPS 200; a low pass filter 212, which removes noises from the differentiated TPS signals; a determination block 213, which determines whether the processed TPS signal transmitted from the low pass filter 212 increases to be greater than a first reference value and also determines whether the processed TPS signal declines to be less than a second reference value; and a damper control block 215, which adjusts the damping forces of the dampers 230F, 230R according to the determination result made by the determination block 213.

The operation of the ECS apparatus of the second preferred embodiment will now be described with reference to FIG. 6, which illustrates damping force control profile provided by the ECS apparatus.

First, the TPS signal is transmitted from the TPS 200 to the differentiation block 211 in which the TPS signal is differentiated, and the speed signal is transmitted from the vehicle speed sensor 205 to the determination block 213. The differentiated TPS signal is transmitted to the low pass filter 212 which removes noises from the differentiated TPS signal. The differential value of the TPS signal generated from the low pass filter 212 is transmitted to the determination block 213 in which an increasing differential value of the TPS signal is compared with a first reference value RV3 and a decreasing differential value of the TPS signal is compared with a second reference value RV4. If the determination block 213 determines that the TPS signal rises to exceed the first reference value RV1 at time t0' (see (b) of FIG. 6), the determination block 213 transmits an anti-squat signal to the damper control block 215 to operate the dampers 230F, 230R in an anti-squat mode as described below. Then, the damper control block 113 adjusts the damping forces of the dampers 230F, 230R substantially at time t0' in response to the anti-squat signal in order to suppress a squat.

Figure 6:
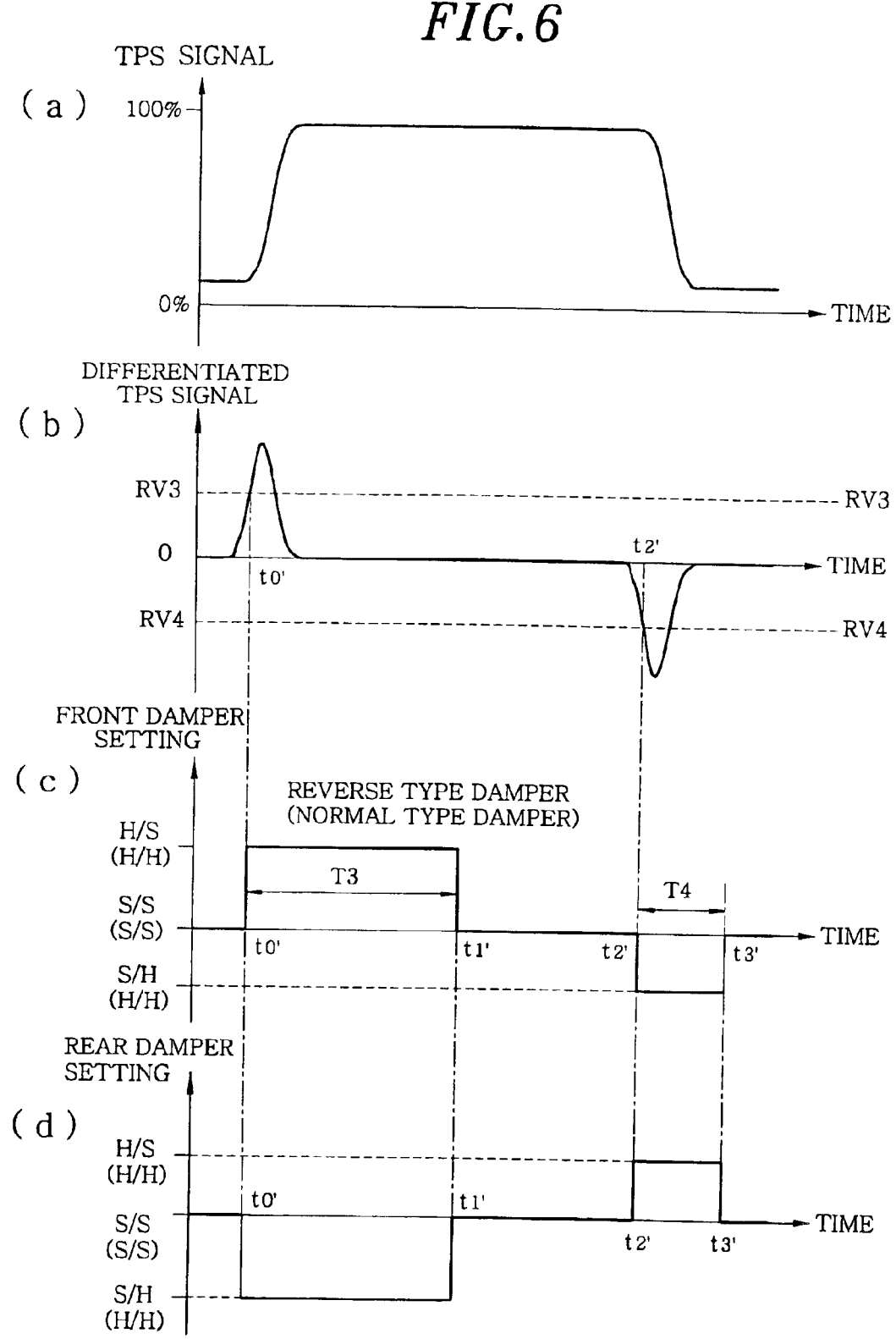
FIG. 6 releases a graph illustrating a damping force profile provided by the ECS apparatus of the first preferred embodiment.

As shown in (c) and (d) of FIG. 6, in a case where the dampers 130F, 130R are of the reverse type, the damper control block 215 sets the front dampers 230F into an H/S mode and maintains this damper setting from time t0' to time t1', i.e., during a control time period T3, to provide hard rebound and soft compression strokes, and sets the rear dampers 230R into an S/H mode and maintains this damper setting during the control time period T3 to provide soft rebound and hard compression strokes.

In contrast, if the dampers 230F, 230R are of the normal type, the damper control block 215 sets the front and rear dampers 230F, 230R into an H/H mode and maintains this damper setting during the control time T3 to provide hard rebound and hard compression strokes.

After the control time T3, the determination block 213 transmits a reverting signal to the damper control block 215. Then, the damper control block 215 sets the front and rear dampers 230F, 230R into the S/S mode again and maintains this damper setting until the determination block 213 determines that the differential value of the TPS signal decreases to be less than the second reference value RV4 at time t2' (see (b) of FIG. 6).

If the determination block 213 makes such a determination, it transmits an anti-dive signal to the damper control block 215 to operate the dampers 230F, 230R in an anti-dive mode as described below. Then, the damper control block 215 adjusts the damping forces of the dampers 230F, 230R substantially at time t2' in order to suppress a dive.

As shown in (c) and (d) of FIG. 6, when the dampers 230F, 230R are of the reverse type, the damper control block 215 sets the front dampers 230F into the S/H mode and maintains this damper setting from time t2' to time t3', i.e., during the control time period T4, to provide the soft rebound and hard compression strokes, and sets the rear dampers 230R into the H/S mode during the control time period T4 to provide the hard rebound and soft compression strokes.

In contrast, if the dampers 230F, 230R are of the normal type, the damper control block 215 sets the dampers 230F, 230R into the H/H mode during the control time T4 to provide the hard rebound and hard compression strokes.

After the control time T4, the determination block 213 transmits the reverting signal to the damper control block 215. Then, the damper control block 215 sets the front and rear dampers 230F, 230R into the S/S mode and maintain this damper setting until the determination block 213 determines that the differential value of the TPS signal increases to be greater than the first reference value RV3 again.

The degree of the damping forces (i.e., the degree of the hardness and/or softness of the dampers) can be preferably made to be constant irrespective of the vehicle speed. In the present invention, however, the determination block 213 more preferably determines the degree of the damping forces of the dampers 230F, 230R depending on the speed signal transmitted from the vehicle speed sensor 205. In such a case, the anti-squat, and anti-dive signals transmitted from the determination block 213 to the damper control block 215 need to carry information about the degree of the damping forces. For instance, since the amount of squat and dive are likely to become greater at a lower vehicle speed, the degree of damping forces can be made to vary in inverse proportion to the speed of the vehicle at time t0' or time t2'. Specifically, in case of the reverse type front dampers, the rebound and the compression of the dampers can be made harder and softer, respectively during the control time period T3 if the speed of the vehicle is lower at time t0'. Similarly, the rebound and the compression of the front dampers of the reverse type can be controlled softer and harder during the control time period T4 for the lower vehicle speed at time t2'. The rear dampers of the reverse type and the normal type dampers can be controlled in a similar manner. In addition, the lengths of the control time periods T3 and T4 can be made to vary depending on the vehicle speed detected by the vehicle speed sensor 205. Preferably, the lengths of the control time periods T3 and T4 are set in inverse proportion to the speed of the vehicle at time t0' and t2', respectively.

Further, if the time t2' precedes the time t1', the determination block 213 transmits the anti-dive signal to the damper control block 215 at time t2' without transmitting the reverting signal, so that the anti-squat control stops and the anti-dive control starts at time t2'.

As described above, the ECS apparatus for anti-squat control in accordance with the second preferred embodiment sets the dampers into the anti-dive mode during the control time period T4 when the processed TPS signal decreases to be less than a second reference value. Therefore, a sudden drop of a front portion of the vehicle usually occurring when the processed TPS signal declines after a rise can be suppressed.

While the invention has been shown and described with respect to the preferred embodiments, it will be understood by those skilled in the art that various changes and modifications may be made without departing from the spirit and scope of the invention as defined in the following claims.

What is claimed is:

1. An electronically controlled suspension apparatus, comprising:

a throttle position sensor for producing a TPS signal which is representative of an amount of a throttle opening;

at least one front damper mounted on a front portion of a vehicle body; and an electronic control unit including:

a determination block for determining whether the TPS signal rises to be greater than a first reference value and for determining whether the TPS signal declines to be less than a second reference value; and a damper control block, which adjusts a damping force of said at least one front damper according to the determination result made by the determination block, wherein the damper control block sets said at least one front damper into a hard rebound mode to produce a hard rebound stroke during a first control time period when the determination block determines that the TPS signal rises to be greater than the first reference value, and then the damper control block sets said at least one front damper into a hard compression mode to produce a hard compression stroke for a second control time period when the determination block determines that the TPS signal declines to become less than the second reference value.

2. The electronically controlled suspension apparatus of claim 1, wherein the determination block allows the damper control block to set said at least one front damper into soft rebound and soft compression mode to produce soft rebound and soft compression strokes after the second control time period.

3. The electronically controlled suspension apparatus of claim 1, further comprising a vehicle speed sensor for producing a speed signal which is representative of a speed of a vehicle and transmitted to the determination block, wherein the electronic control unit adjusts the damping force in a manner that a degree of the damping force varies in inverse proportion to the speed of the vehicle.

4. The electronically controlled suspension apparatus of claim 1, further comprising at least one rear damper mounted on a rear portion of the vehicle, wherein the damper control block adjusts a damping force of said at least one rear damper according to the determination result made by the determination block, and wherein the damper control block sets said at least one rear damper into the hard compression mode to produce the hard compression stroke for the first control time period when the determination block determines that the TPS signal rises to become greater than the first reference value, and then the damper control block sets said at least one rear damper into the hard rebound mode to produce the hard rebound stroke for the second control time period when the determination block determines that the TPS signal declines to be less than the second reference value.

5. The electronically controlled suspension apparatus of claim 1, wherein the first reference value is greater than the second reference value.

6. An electronically controlled suspension apparatus, comprising:

a throttle position sensor for producing a TPS signal which is representative of an amount of a throttle opening;

at least one front damper mounted on a front portion of a vehicle body; and an electronic control unit including:
  a differentiation block for differentiating the TPS signal;
  a determination block for determining whether the differentiated TPS signal increases to be greater than a first reference value and for determining whether the TPS signal decreases to be less than a second reference value; and
  a damper control block, which adjusts a damping force of said at least one front damper according to the determination result made by the determination block, wherein the damper control block sets said at least one front damper into a hard rebound mode to produce a hard rebound stroke for a first control time period when the determination block determines that the differentiated TPS signal increases to be greater than a first reference value, and then the damper control block sets said at least one front damper into a hard compression mode for a second control time period when the determination block determines that the differentiated TPS signal decreases to be less than the second reference value.

7. The electronically controlled suspension apparatus of claim 6, wherein the damper control block sets said at least one front damper into soft rebound and soft compression mode to produce soft rebound and soft compression strokes after the second control time period.

8. The electronically controlled suspension apparatus of claim 6, further comprising a vehicle speed sensor for producing a speed signal which is representative of a speed of a vehicle and transmitted to the determination block, wherein the electronic control unit adjusts the damping force in a manner that a degree of the damping force varies in inverse proportion to the speed of the vehicle.

9. The electronically controlled suspension apparatus of claim 6, further comprising at least one rear damper mounted on a rear portion of the vehicle, wherein the damper control block adjusts a damping force of said at least one rear damper according to the determination result made by the determination block, and wherein the damper control block sets said at least one rear damper into the hard compression mode to produce the hard compression stroke for the first control time period when the determination block determines that the differentiated TPS signal is greater than the first reference value, and then the damper control block sets said at least one rear damper into the hard rebound for the second control time period when the determination block determines that the differentiated TPS signal is less than the second reference value.

* * * * *